May 3, 1966

G. R. MOORE ETAL 3,249,079

LAMINATED DECKING

Filed July 26, 1963

GEORGE R. MOORE
PHILIP ADELMAN
INVENTORS.

BY
Nilsson & Robbins

ATTORNEYS.

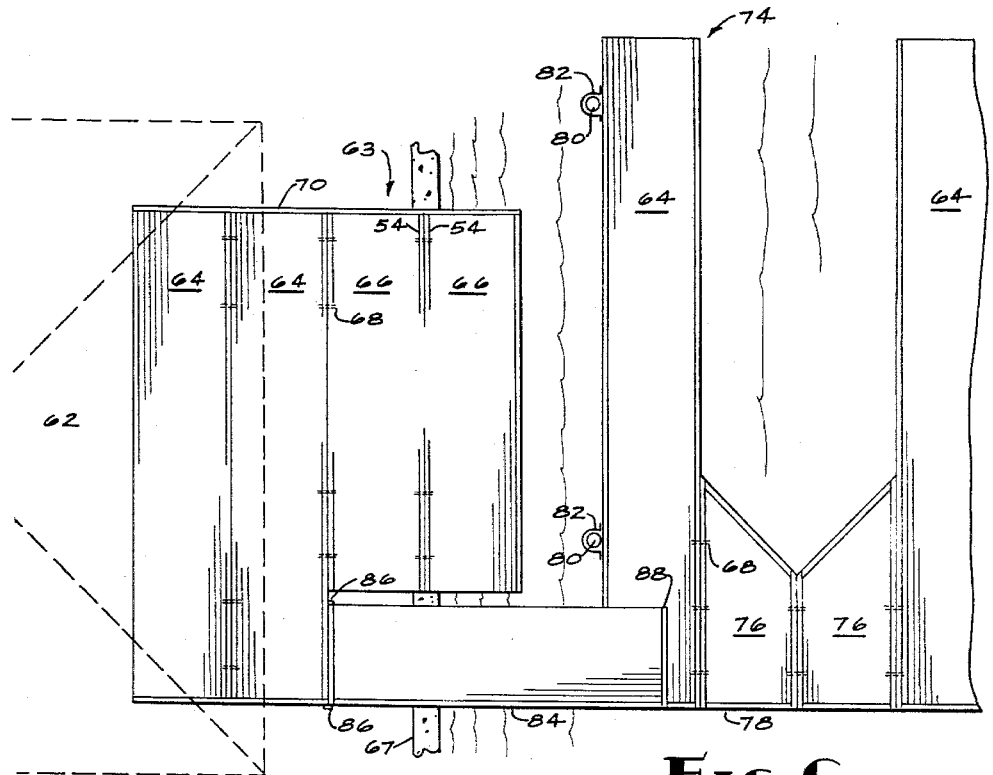
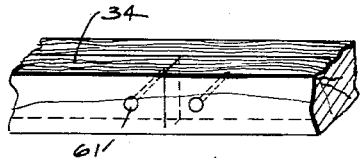
FIG. 5
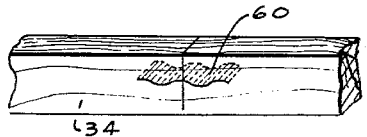
FIG. 4
FIG. 6
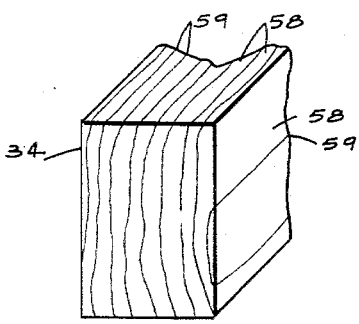
FIG. 2
FIG. 3
GEORGE R. MOORE
PHILIP ADELMAN
INVENTORS May 3, 1966   G. R. MOORE ETAL   3,249,079
LAMINATED DECKING
Filed July 26, 1963   4 Sheets-Sheet 3
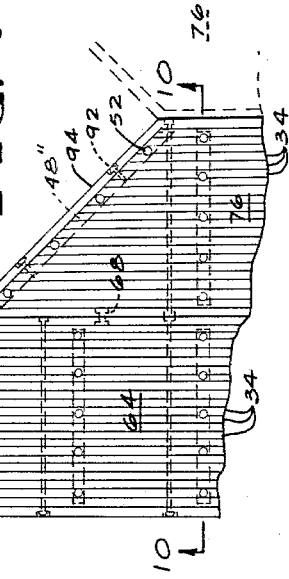
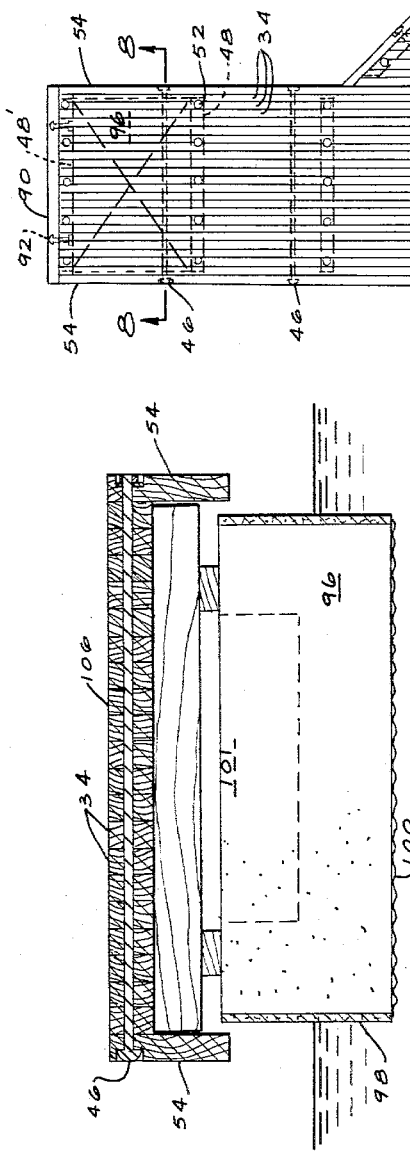
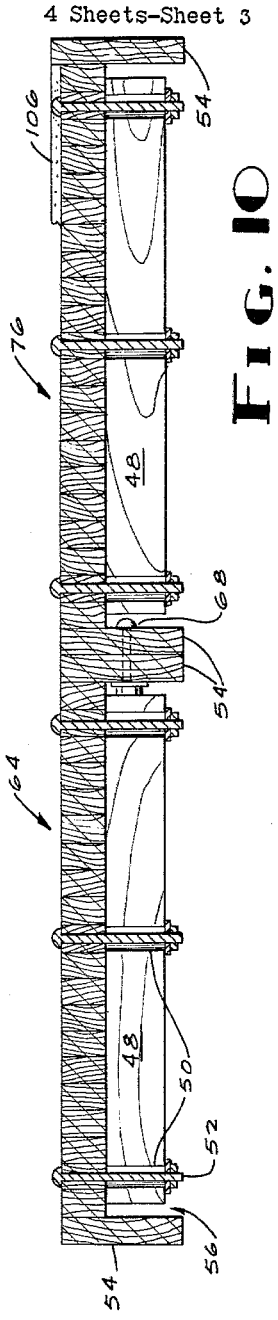
GEORGE R. MOORE
PHILIP ADELMAN
INVENTORS
BY
Nilsson & Robbins
ATTORNEYS.

GEORGE R. MOORE
PHILIP ADELMAN
INVENTORS

BY Nilsson & Robbins
ATTORNEYS

United States Patent Office 3,249,079
Patented May 3, 1966

3,249,079
LAMINATED DECKING
George R. Moore, 500 Winslow Ave., Long Beach, Calif., and Philip Adelman, 10923 California Ave., Lynwood, Calif.
Filed July 26, 1963, Ser. No. 297,857
13 Claims. (Cl. 114—.5)

This invention relates to a floating wharf structure and method and more particularly to novel wood laminated deck units of unitary or composite construction, and, in some embodiments supporting pontoons. Single or multiple such deck units may be assembled together, in accordance with this invention, into walkways and finger piers, to form a marina system. The laminated deck units may cooperatively or additionally, when desired, form gangways, patio decks, and other deck structures associated with marinas.

There are presently existing and rapidly growing future needs for economically practicable, long-lasting, aesthetically pleasing marina decking as for marinas or small boat docking, walkways, swimming docks, and the like. The present need stems in large measure from existing marina facilities which heretofore have been constructed in a manner requiring expensive initial cost, maintenance, and replacement; and the rapidly growing need stems from the hundreds of new marinas and marine living tract areas being developed each year on lakes, rivers, and coastal regions in the United States alone.

Systems heretofore available for such needs generally comprise a series of pontoons which are tied together and over the tops of which a deck is secured which may itself be the tieing member. The pontoons have been of steel drums, coated plywood boxes, hollow concrete boxes, plastic foam blocks, hollow fibre glass boxes, and the like. The decking has been of such materials as timber planking, sheets of coated plywood, Fiberglas panels, concrete panels, and metal sheets in some cases.

The general systems described above have evolved because a floating system automatically provides a deck surface which is referenced to the water surface or to boats afloat thereon, regardless of tides or lake level. Such a system also provides an amount of resiliency which is helpful in withstanding varying loads and impacts; that is, the water absorbs impact energy; and the pontoons simply sink lower to provide additional displacement when more floatation is needed due to increased toploading on the deck.

Previous attempts to develop satisfactory marina systems have typically been directed toward providing hollow pontoons which are fabricated or constructed of coated plywood, Fiberglas, or concrete. Decks and walkways and the like are then constructed over them to hold them in place and to cover them against becoming filled by rain or splash. A majority of such systems require extensive maintenance or are not satisfactorily permanent which causes them to be expensive, at least in the long run. The better of such systems are substantially permanent but often are aesthetically deficient and are so expensive initially as to be not economcially feasible for most applications.

Prior art systems which utilize concrete pontoons use a basically low-cost material which withstands abrasion, floating oils and is fireproof, but they require expensive labor in forming them and in installing them at the job. If they are prefabricated their fragility and weight require expensive transportation.

Low-density concrete with porous aggregate is utilized in some pontoons for greater flotation and lower handling costs, but the porous aggregate requires very great amounts of water in the mix which eventually leaves the portions of the concrete structure which are not submerged. The resulting severe difference in dehydration results in differential expansions and contractions between the exposed and submerged portions of the pontoon. The result of course is eventual structural leakage and weakening. When a higher density concrete is used even more displacement is required; and handling, as noted above, is made more difficult.

A further disadvantage of concrete systems is their relatively large inertia. When they are set in motion as by unusual currents, surges, tidal waves, or storms they tend to suffer severe and often destructive stresses in their structure and joints. Their greater inertia also detracts from their "resiliency" with respect to boat impact.

A further and general disadvantage of concrete or Fiberglas pontoons is that because of the density of their materials they are inherently sinkable if pervious or if they become broken or punctured. This aspect requires that additional and unsinkable flotation be provided or continuous costly pumping maintenance be employed.

When foam materials with unprotected surfaces are used for pontoons they are at best subject to destructive abrasion and in addition are not therefore readily cleaned of marine oragnisms. Further, some foam materials become excessively damaged or broken-away due to impact and thereby lose displacement. In addition, presently available foam materials that are resistant to floating gasolines and other chemicals are prohibitively expensive.

Prior art decking systems have suffered the general disadvantages of structural weakness, lack of adjustment for shrinkage, undesirable weight, high maintenance costs, short life, prohibitively high initial costs. When plywood is used for decking and diagonal strength, it is generally nailed or screwed into position which becomes loose with continued movement, and furthermore, unless expensive marine plywood is used, has a relative short lifetime. In addition, flat timber planking when nailed to timber framing a usually field nailed and tends to twist and pull away from the framing and also split and shake, all caused by movement and attack from the elements. Furthermore, prior art systems cannot satisfactorily be structurally or aesthetically tied in with dock-side patios, balconies, sundecks, and other flooring or decking of modern marina homes.

It is therefore an object of the present invention to provide a novel marina system structure and method of construction which are not subject to these and other disadvantages of the prior art.

It is another object to provide such a system which is substantially permanent.

It is another object to provide such a system which is low in initial cost and in maintenance costs.

It is another object to provide a marina system that provides structural integrity while eliminating the maintenance problem of nails and lag screws.

It is another object to provide such a system which may be a mass-produced manufactured product in a factory and shipped to the job as units.

It is another object to provide such a system which is installed on the job with a minimum amount of expensive field labor and equipment.

It is another object to provide such a system which is inherently unsinkable.

It is another object to provide such a system which is aesthetically pleasing and desirably combinable with all architectural styles of marina homes.

It is another object to provide a wooden marina system while substantially eliminating tendencies of or damages from shrinkage, expansion, shaking, peeling, bowing or warping, individually or as a system.

It is another object to provide such a system which will resist bowing and warping by being inherently adjustable for shrinkage and expansion.

It is another object to eliminate inspection holes and the expense of continual pumping out of pontoons which leak.

It is another object to provide a marina system which can utilize all available water area by being flexible in regard to total lengths of its sections.

It is another object to provide a system which can have any length or width by economically combining standard sections together.

It is another object to provide a walkway which provides an accessible utility trough area which is disposed to protect the utility lines from water and physical damage.

It is another object to provide a marina system structure which is flexible enough to prevent damaging stresses from wave, wind, and boat action.

Briefly, in accordance with one example of an embodiment of the present invention these and other objects are achieved in a marina system which includes a decking or walkway slab assembly manufactured in a continuous integral length which may be transversely cut and finished to any predetermined job length. The continuous assembly is constructed of a relatively large number of wooden elements such as two-by-threes in random lengths laid on edge with the cross grain running predominantly vertically and with the three-inch surfaces of adjacent elements being sandwiched together in a juxtaposed relationship. The assembly is tied together with thru bolts or rods to form, in this example, a 48" wide deck unit or walkway assembly.

The ends of the two-by-threes, in this example, are keyed in a manner whereby the front end of each is securely held by an interlocking relationship against vertical displacement by the rear end of its preceding plank along the length of the assembly.

During fabrication of the assembly in this example, a drill may be passed through the entire width of the assembly or may be passed from either side to one-half the width, the drill bit being guided in a true line by a series of plates, with holes, tied together as a jig with plates between each lamination or group thereof. A bolt or prethreaded rod is then inserted therethrough in a manner to compress the "stacked" two-by-threes. The assembly slab is then moved along the production line for a predetermined distance; new two-by-threes are inserted to continue the assembly where any of the elements have terminated; then another transverse bore is provided and another bolt inserted. The assembly is then moved again and the process may be continued indefinitely. Alternatively, as will be discussed in more detail below, the transverse bores may be provided by a gang-drilling step.

Longitudinally extending rub rail bend and torsion resisting stringers, and the like may be assembled integrally with the other elements as desired. In addition transverse bend and torsional resistant blocking, and finishing details may be applied on the same assembly line.

Pontoon flotation units comprising an unsinkable expanded cellular or extruded plastic foam filler such as Styrofoam, Tyrilfoam, polystyrene, or urethane, are provided which are cooperatively retained under the decking assembly by the longitudinal and transverse stringer elements. The foam pontoon blocks may be completely covered with a skin of asbestos cement board such as Flexboard or Asbestocite or the top and bottom surfaces may be left bare or coated with a protective film such as a trowel or spray coat of asbestos cement paste.

The cement board may be approximately 1/8" thick and be bonded to the foam by a suitable adhesive or by a chemical bond. The foam may thus be permanently and inexpensively sealed against gasoline and other floating chemicals which would otherwise cause the eventual disintegration of non-gasoline-resistant foam filler. In addition most marine organisms which accumulate on the pontoon may be readily removed without abrasive damage to the foam. Further, the asbestos cement board skin protects the form from impact, abrasion, and fire damage. Stainless steel approximately 0.02" x 0.500" may be banded around the cement board to afford further assembly assurance.

Further details of these and other novel features and other examples as well as additional objects and advantages will become apparent and be best understood from a consideration of the following description taken in connection with the accompanying drawings which are all presented by way of illustrative example only and in which:

FIG. 2 is an end view of an elongated wooden element of the structure shown in FIG. 1;

FIG. 3, FIG. 4, FIG. 5 are longitudinal sectional views of alternative examples of a portion of the structure shown in FIG. 1 taken along the lines 3, 4, 5–3, 4, 5, thereof;

FIG. 6 is an overall plan view of an example of a marina installation constructed in accordance with the principles of the present invention;

FIG. 7 is a more detailed view of a portion of the structure shown in FIG. 6;

FIG. 8 is a cross-sectional view of a portion of the structure of FIG. 7 taken along the lines 8—8 thereof;

FIG. 10 is a cross-sectional view of a portion of the structure of FIG. 7 taken along the lines 10—10 thereof;

Referring to the particular figures it is stressed that the details shown are by way of example only and are presented in the cause of providing what is believed to be the most useful and readily understood description of the principles of the invention. The detailed showing is not to be taken as a limitation upon the scope of the invention which is defined by the appended claims forming a part of this specification.

Figure 1:
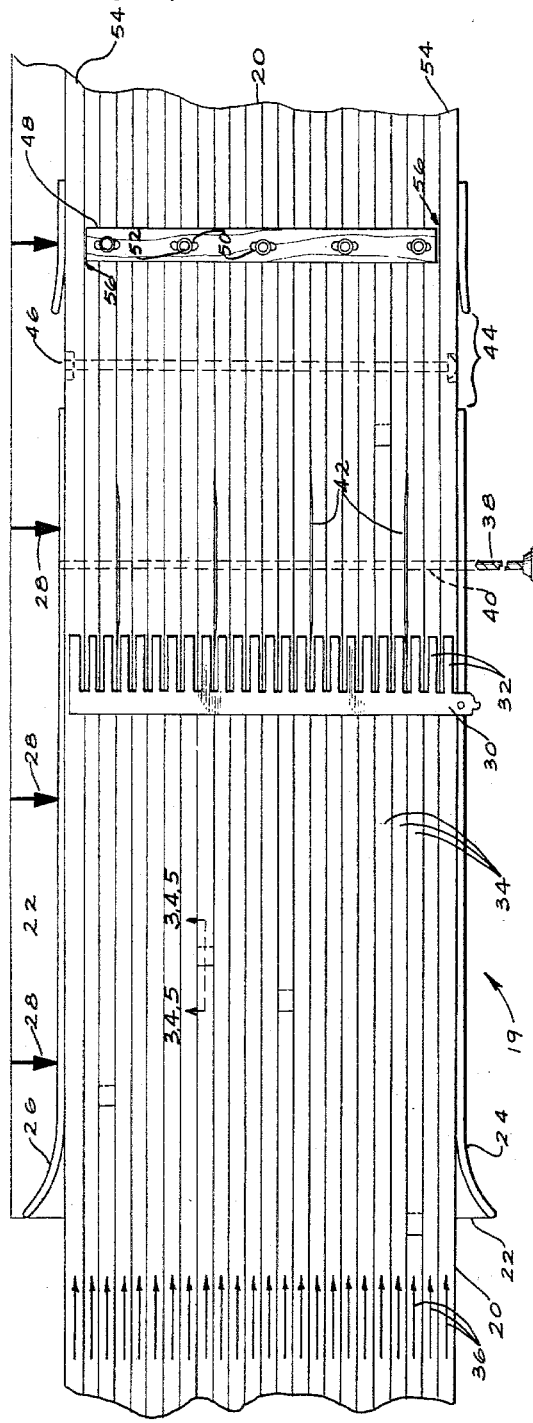
FIG. 1 is a partially schematic plan view of an apparatus illustrating a method of construction of a marina system component in accordance with the principles of the present invention.

In FIG. 1 an example of an assembly jig 19 for accomplishing the steps of the method of the present invention is illustrated in plan view and includes a horizontal reference plane table 22, having a rigid side guide 24 and a spring-biased side guide 26. A series of spring means for urging the side guide 26 toward the side guide 24 are indicated schematically by the force arrows 28. The assembly jig 19 further includes a frame member 30 which is rigidly affixed thereto and which includes a plurality of downwardly stressing fingers 32 at least one of which presses downwardly, against the reference table 22, each one of a plurality of elongated wooden decking elements 34, which for the purposes of the present example may be considered to be two-by-threes or two-by-fours.

In operation a number of two-by-three elements 34 are inserted into the jig 19 as indicated by the motion arrows 36 to form a composite deck assembly slab 20 which is typically two to four feet wide. When the elements are in place within the jig 19 and firmly compressed so that their broad faces are in juxtaposed compressed contact, a drill 38 is passed transversely through all the elements of the assembly, or drilled concurrently, half-way from both sides, to form an in-register bore 40. A series of drill guide means 42 may be provided to prevent any lateral wandering of the drill 38 as it is passed through the width of the slab.

The deck assembly slab 20 is then advanced along the assembly jig 19 to an opening 44 in the side guides 24, 26 where a pre-stressed steel wire with gripping buttons at its ends, not shown, or a bolt or end threaded metal rod 46, is inserted through the bore 40. The bolt or rod 46 is then stressed initially to hold the composite slab 20 in transverse compression. The tension of the bolt 46 may readily be made to be sufficient to provide a high magnitude of diagonal strength in the composite slab 20 against shear motion between the individual elements 34. In addition the initial compression and the inter-face friction of the wooden elements by the tensile stressed bolt 46 in large measure prevents warping or bowing of the slab 20 and provides some diagonal strength in the composite slab against shear motion between the individual element 34 in addition to that afforded directly by the bolt itself.

As indicated earlier, drilling the pre-assembled units in widths of two or more laminations can be accomplished by either a one drill operation or by using a production technique or gang pre-drilling through one or more of the members 34.

After the bolt 46 is inserted and initially stressed, the assembly may be moved further to the right, as viewed in the drawing, and a bend and torsion resistant cross-member 48 be affixed as shown. The cross-member 48 may be a wooden two-by-six having its narrow edge disposed in contact with the narrow edges of the elements 34. A series of transversely elongated or otherwise oversized bores 50 are provided vertically through the cross-member 48. A vertical tension member such as a bolt 52 may then be passed through a snug bore in each of appropriate ones of the elements 34 and through the transversely elongated bores 50. In this manner additional bend and torsion resistant strength is added to the assembly slab; and when shrinkage occurs across the width of the composite slab, the elongation of the bores 50 will permit, if desired, the maintenance of a tight compression across the slab by tightening the tension bolt 46. Further, in this regard, it may be noted that the overall length of the cross-member 48 in the transverse direction is less than the initial spacing between the rub-rail stringer elements 54 which form the side boundaries of the elongated assembly slab 20.

It is preferable in accordance with one practical embodiment of the present invention to provide rub rail stringer elements 54 which have a significantly larger vertical dimension than do the inner elongated elements 34. The purposes and advantages of this greater vertical dimension will be discussed more fully below. It is sufficient here to point out that the space 56 between the inner edge of the rail elements 54 and the ends of the cross-members 48 allows for the inherent transverse shrinkage suffered by the composite slab without forcing the rail elements 54 to become spaced from the remainder of the slab.

The novel way in which the deck laminations are tied together as a composite unit with a threaded rod restrains the laminations from moving independently in the vertical and longitudinal direction. Thus the assembled unit can withstand any vertical deck loads or lateral impact boat loads. At the same time the assembled unit is flexible enough to twist and flex due to stress as from wave, wind, and boat action without harmful structural damage. Furthermore, physical damage to the deck structure as caused, for example, by dropped objects is negligible as compared with prior art systems.

Variations in finishing the basic laminated marina elements may, in accordance with the objects of the invention, be incorporated best to suit the particular needs of a given application. The laminated timber may be treated with a preservative salt preparation such as "Wolmanized Salts." Another variation is to insert a galvanized plate or washer between the laminations on the through rods thus eliminating the possibility of dry rot between the laminations. Where the marina is installed in salt water all metal and hardware are galvanized by a hot dip process.

Because the laminated deck is normally a solid, continuous surface unit, many surface treatments can be applied to provide a non-skid, maintenance free surface. One method is to apply a clear epoxy or resin with or without Fiberglas mesh, topped with pumice sand, to enhance and preserve the beauty of the wood laminations. Another method is to raise the rubbing rails to provide screening forms. A colored concrete deck surface may then be poured over the laminations. Still a third method is to attach to the desk surface a layer of cement asbestos board topped with a color coat of epoxy resin and pumice sand; or the surface of the asbestos board may be embossed with a diamond tread.

Referring to FIG. 2, an end perspective view of a typical two-by-three wood laminate deck element 34 is shown to illustrate presently preferred means and techniques for minimizing peeling, warping, bowing and shaking of these elements. It is to be seen that the cross grain of the wood is predominantly vertical. This type of grain structure is provided, or selected, so as to minimize the amount of soft wood 58 between growth rings 59 which is exposed to the elements of sun and/or water. The broad side of the member 34 is seen to have obviously a much greater proportion of soft wood between the darker lines of hard grain, and this is protected from exposure by the stacking technique indicated above. It has been found that both warping and bowing of individual elements and a composite deck assembly slab have been reduced by this technique of stacking. Alternatively, the members 34 may be square in cross section or have their greater cross dimension disposed horizontally.

When the slab is bored, stressed, and cross-braced as indicated above and moved along to the right, as viewed in FIG. 1, the individual elements 34 will each in turn terminate due to their finite lengths. It is a desirable feature of the invention that systematically staggered elements 34 are used or, preferably, that random lengths of the elements 34 are provided. The former technique provides greater strength; and the latter technique eliminates substantially all waste. As seen in FIG. 3, FIG. 4 and FIG. 5, the ends of longitudinally adjacent elements 34 may be vertically and longitudinally interlocked, or otherwise mechanically fastened and, when desired, glued. In FIG. 4 a corrugated fastener 60 is illustrated and the structure of FIG. 5 utilizes nails 61 to secure the ends to a continuous portion of an adjacent element 34.

In this manner, as the deck unit is fabricated, new elements 34 are inserted as needed to cause the assembly slab to be indefinitely and continuously long. This gives rise to a highly desirable feature of the invention, namely that the assembly and manufacturing process is continuous and that lengths of the finished slab 20, desired for a particular job, may be cut from the continuous assembly without special and expensive jigging.

Preferably where a slab end is to be provided, a parallel pair of cross members 48 may be affixed and the slab parted therebetween.

Referring to FIG. 6, an overall plan view of a typical installation of a marina system constructed in accordance with the principles of the present invention is presented. A marina dwelling 62 includes a patio or sundeck portion 63 which in this example comprises a combination of a plurality of modular composite deck assembly slabs 64, 66 disposed longitudinally, as shown, or transversely to a sea wall 67. The slabs are of substantially identical construction except that the slabs 64, to illustrate their versatility for design specifications, have been cut to a different length than have the slabs 66. Adjacent edges of the slabs, which edges are formed by the rail elements 54 (see FIG. 1), may be bolted together by a plurality of bolts 68 which will be seen more clearly in the subsequent figures. The deck portion 63 may be further strengthened and trimmed by applying an end member 70 across the full end of the composite assembly. As indicated, the deck portion 63 is affixed to the land, or dwelling 62, and is not floating.

A dock portion 74, however, is indicated as being a floating structure, and consists of an elongated assembly slab 64 which is similar to the deck unit 20 as shown in FIG. 1; and a shorter slab 76 is affixed thereto by bolts 8 and an end member 78. The entire floating assembly may be secured to a plurality of vertical anchor piles 80 by means of pile guide members 82.

The slabs 64, 76 may be repeated to form a symmetrical dock, as shown; the separate slabs being "tied" together by bolts 68 and the end member 78.

The portions 63, 74 may be made accessible to each other by a gangway portion 84 which may be similar in most respects to one of the assembly slabs 66 (20) except that for short gangways the rail members 54 are either deleted or provided with a vertical dimension equal to that of the other elements 34. The gangway portion may be hinged to the deck portion 63 as shown, or to the seal wall 67, by a bolt hinge system 86, while the end 88 of the gangway is provided with a roller and thus is free to move as required back and forth across the width of a portion of the dock portion 74.

Referring to FIG. 7, a portion of the floating dock portion 74 is shown in more detail. It may be noted that, for purposes of clarity, like elements are referred to with the same reference numeral throughout the figures in each instance where it is deemed useful so to do. Yet it is not intended that such will be construed in any manner to narrow the scope of this disclosure and specification. For example, the outer rub rail stringer element of a dock assembly slab is designated element 54 throughout the figures, whether it be equal in vertical dimension to the regular elements 34, or greater or less. Another example is that the fastening means 68 may in some cases be a bolt while in others it may be a clamp, but throughout the specification it is referred to as a bolt 68, in a manner best to clarify and designate its function.

In FIG. 7 the bend and torsion resistant cross members 48 and the vertical bolts 52, which connect them to the elements 34 of the assembly slab, are shown in their overall assembled relationships. One cross member 48′ is illustrated as being affixed to the slab at the end thereof in a manner so that an end element 90 may be bolted hereto by bolts 92. An oblique rail member 94 may be applied for trim and finishing purposes as well to provide a portion of a continuous rub rail around the entire dock assembly. An oblique cross member 48″ may be bolted to the under side of the ends of the elements 34 of the slab 76 by a series of bolts 52 similarly to the means described in connection with the end rail 90 across the end of the slab 64. Again the oblique cross member 48″ may be bolted to the oblique rail member 94 by a series of bolts 92.

Referring now to FIG. 8 as well as to FIG. 7, it is to be noted that, in this example, the rub rail stringer members 54, in cooperation with a pair of adjacent cross members 48, form a retaining system for a flotation pontoon 96. The pontoon flotation units 96, in this example, may be formed of unsinkable expanded cellular or extruded plastic foam filler such as Styrofoam, Tyrilfoam, polystyrene, or Polyurethane which, as indicated above, are cooperatively retained under the decking assembly by the longitudinal and transverse stringer elements thereof. The foam pontoon blocks are either protected on the sides of the pontoon or completely encased with a skin of cement asbestos board 98 such as Flexboard or Asbestolite. Where only the sides of the pontoon have a cement board skin, the top and the bottom of the pontoon may be provided with a coating 100 of water insoluble cement paste. The cement board may be approximately ⅛″ thick and be bonded to the foam surface of the pontoon by a waterproof adhesive. An alternative example of a method of manufacturing the pontoon 96 is to place the cement board 98 along the sides and bottom of a mold and foam the plastic into the lined mold. The cement board 98 is thusly chemically bonded to the plastic foam block. Further economy can be achieved by inserting inexpensive foam scrap or forming voids in the center regions 101 of the foam block by inserting simple steel shells in the mold thus saving overall foam volume costs. The plastic foam pontoon 96 is thus permanently and inexpensively sealed against gasoline and other floating chemicals which would otherwise cause the eventual disintegration of non-gasoline resistant foam. In addition, as indicated above, marine organisms which accumulate on the pontoon may be readily removed without abrasive damage to the foam; the asbestos cement board skin protects the plastic foam from impact and abrasion forces and fire damage. Alternatively, the pontoons 96 may be longer whereby the deck slab cross members 48 rest on top thereof.

Figure 9:
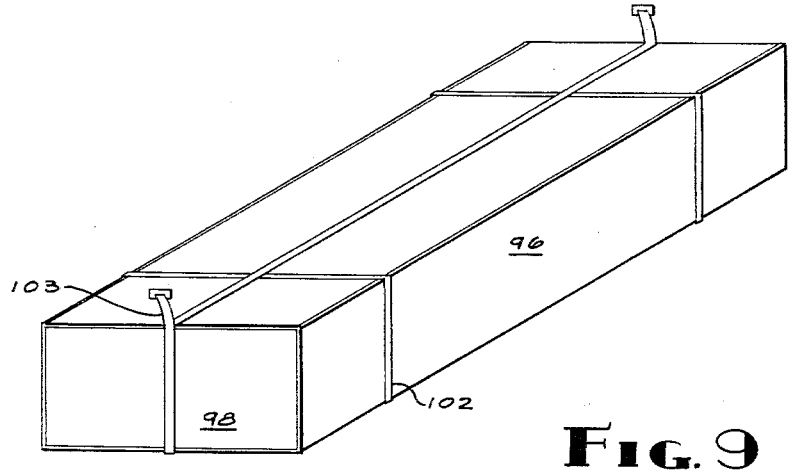
FIG. 9 is a perspective view of pontoon members shown in section in FIG. 8.

In FIG. 9 additional strength and protection for the outside surface of the pontoon 96 is illustrated. The pntoon body, covered with the rigid board skin 98 is banded with stainless steel straps 102 approximately ½″ by .02″ thickness. The ends of the straps may be provided with extensions and strap anchors 103 which are attached to the deck to prevent pontoon displacement in heavy wave action.

In a practical example of the invention, the pontoon 96 was the width of the assembly slab, approximately six feet long, and fourteen inches in depth. The plan area and spacing of the pontoons are highly versatile criteria and may be selected with side latitude best to suit the needs of a particular application.

Also in FIG. 8, the function of the elements 54 as rub rails and bend and torsion resisting stringers in addition to providing trim and retention of the pontoon 96, is illustrated. The bolts 46 forming a tension member across the deck assembly slabs are also illustrated. On top of the deck surface a layer 106 of Fiberglas or epoxy or concrete or asbestos cement board may be applied for added protection to the otherwise exposed wood surface. The layer 106 in either event may contain a suspension of pumice particles for improved traction on the deck surface.

Referring to FIG. 10 further details of a deck assembly slab construction in accordance with the features of the invention are shown. The deck slabs 64 and 76 are shown as bounded on each edge by a rail element 54, the outer ones of which form rub rails and the inner ones of which form adjoining members which are bolted together by a series of bolts 68, as indicated previously in FIG. 7 and in FIG. 6. In addition the vertical tension members or bolts 52 are illustrated with greater clarity. Also it may be seen that the oversized bores 50 through the cross members 48 and the spaces 56 provide a lateral shrinkage relief with respect to any shrinkage suffered by the elements 34. As indicated in FIG. 8 a protective layer 106 may be applied when desired over the top surface of the deck. To this end the outer rub rail element 54 may be adapted to extend, as indicated, above the deck surface by a distance equal to the thickness of the layer 106.

Figure 11:
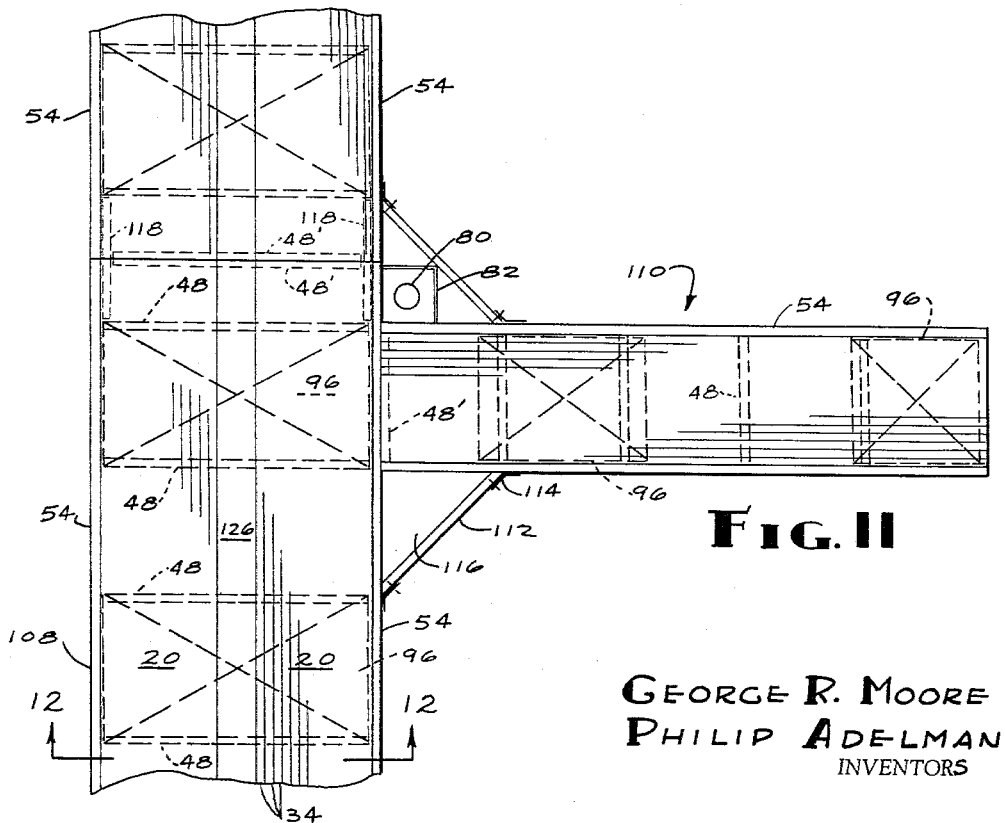
FIG. 11 is a plan view of another example of a marina installation constructed in accordance with the principles of the present invention.

In FIG. 11 an example of the invention is illustrated in which an indefinitely long walkway assembly 108 of walkway units 20 is provided and is constructed in accordance with the present invention. Affixed to the walkway assembly 108 are a plurality of finger pier assembly units 110 which are abutted coplanarly thereto. A pair of diagonal braces 112 may be employed to join rigidly the finger assembly 110 to the rub rail stringer 54 member of the walkway assembly 108 by employing sets of bolted clip angles 114. In addition a triangular section of plywood or wood laminate 116 may be applied as a fillet for increased diagonal strength and bracing as well as for additional walkway space. In addition the triangular plywood sections 116 may be cut away where desired to permit the bringing through of utility facilities and vertical anchor piles 80. The anchor piles 80, may be alternatively provided at either side of the walkway assembly 108 or at the outside end of the finger pier unit 110. A pile guide 82 is secured to the laminate fillet 116, elements 54, and braces 112.

The walkway assemblies 20, of finite length, may be connected at their respective rub rail stringer elements 54 with a plurality of bolted splice plates 118; and end transverse elements 48' may also be interconnected cooperatively, as shown, for strength of assembly.

A series of flotation pontoons 96 may be retained under the deck assembly slabs 108, 110 in the positions indicated by means similar to those disclosed and discussed in connection with FIG. 7 and FIG. 8.

Figure 12:
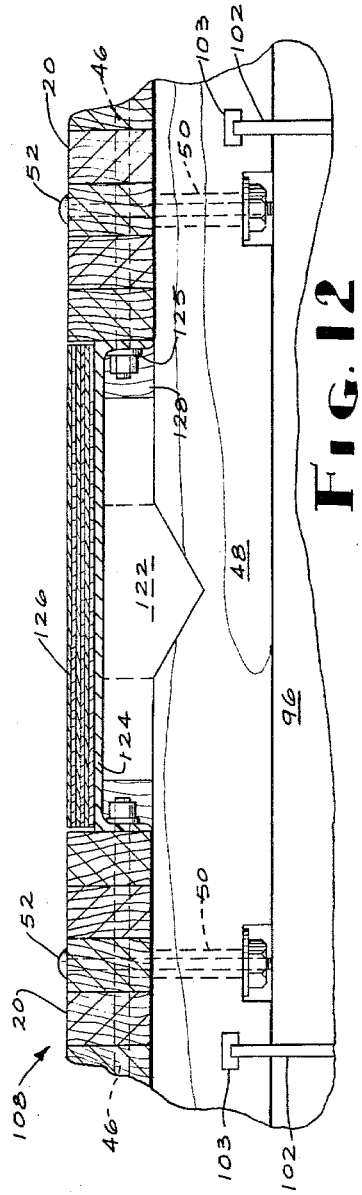
FIG. 12 is a cross-sectional view of an alternative example of the invention.

Referring to FIG. 12, a typical cross section of the walkway assembly structure of FIG. 11 is ilustrated. A pair of deck assembly slabs 20 are longitudinally joined in a manner which, though generally functionally equivalent to that of FIG. 10, is an alternative thereto which is particularly useful for extended walkway assemblies, as for commercial marinas.

The transverse members 48 extend, in the cross-frame manner indicated, across both of the deck slab units 20. A series of deck bolts 52 secure the unit 20 to the member 48. As in the previous examples the vertical bores 50 in the cross member are oversized or elongated in the shrinkage direction. The deck units 20 are, in this example, spaced to provide an accessible, protected space for utility lines and conduits 122. The bolts, or transverse tension members 46 may be secured by cooperatively threaded spacer brackets 124. Alternatively threaded nuts 125 may be provided, as shown, to aid in securing the units 20 together as well as to maintain the desired tension in the bolts 46 and to transmit laterally directed loads through the walkway assembly 108. The top surface of each bracket 124 is parallel to the top surface of the decking and is spaced therefrom by a distance equal to the thickness of a removable plywood trough cover 126 which is supported by the spacer bracket. Additional support for the trough cover may be provided by longitudinal blocking 128 which may lie along the tops of the cross members 48 near the inner edge of each of the slab units 20.

The pontoon 96, a portion of which is shown in the figure may have a width equal to the full width, between its rub rail elements, not shown, of the walkway assembly 108. Again, when desired, non-corrosive binding straps 102 and their extensions and anchors 103 may be provided to secure the pontoons to the under side of the decking.

There has thus been disclosed a number of examples of a marina system structure and method which achieves the objects and exhibits the advantages discussed hereinabove. In particular it is stressed that the system disclosed is an exceedingly economic and substantially permanent one, while at the same time being particularly pleasing aesthetically because of the hand-crafted nautical appearance of the laminations in the decking slabs

What is claimed is:

1. A marina system structure comprising: a deck assembly slab of arbitrary length including a plurality of initially laterally compressed and longitudinally secured wooden deck members having a vertical thickness determinative of that of said slab, said members having arbitrary lengths, the ends of adjacent ones being not in lateral register with each other wherever ones of said members terminates short of the end of said assembly slab; a plurality of horizontal shear restraining tension members disposed transversely to said slab assembly and connecting said deck members into a composite integral-unitary configuration; a plurality of bend and torsion resisting cross members disposed transversely to said slab assembly in contact with the under edges of said deck members and having an overall dimension in the direction of the width of said slab which is less than that of said slab assembly; said cross member being vertically foraminated to define a plurality of bores along its length, said bores having a predetermined cross section in the direction of the length of said cross member; a plurality of vertical tension elements connected to ones of said deck members and passing through said bores and having a cross dimension in the direction of the length of said cross member which is less than said predetermined cross dimension of said bores for securing said slab assembly to said cross member in vertically compressive contact; and at least one bend and torsion resisting wooden elongated rub rail stringer deck element disposed along the side edge of said slab assembly and being secured in composite contact with said assembly by said horizontal tension members and having an upper edge disposed substantially coplanarly with those of said deck members and having a vertical thickness which is greater than that of said deck members.

2. A marina system structure comprising: an arbitrarily long deck asembly slab including a plurality of initially latrally compressed wooden deck members having a vertical thickness determinative of that of said slab, a predominance of said members having a substantially vertical cross grain, said members having arbitrary lengths, the ends of adjacent ones being not in lateral register with each other wherever ones of said members terminate short of the end of said assembly slab; a plurality of horizontal tension members disposed transversely to said slab assembly and connecting said deck members into a composite integral-unitary configuration; a plurality of bend and torsion resisting cross members disposed transversely to said slab assembly in contact with the under edges of said deck members and having an overall dimension in the direction of the width of said slab which is less than that of said slab assembly; said cross members being vertically foraminated to define a plurality of bores along its length, said bores having a predetermined cross section in the direction of the length of said cross member; a plurality of vertical tension elements connected to ones of said deck members and passing through said bores and having a cross dimension in the direction of the length of said cross member which is less than said predetermined cross dimension of said bores for securing said slab assembly to said cross member in vertically compressive contact; at least one wooden elongated rub rail stringer deck element disposed along the side edge of said slab assembly and being secured in composite contact with said assembly by said horizontal tension members and having an upper edge disposed substantially coplanarly with those of said deck members and having a vertical thickness which is greater than that of said deck members; and at least one flotation pontoon fabricated predominantly of lighter than water material retained below said deck assembly.

3. The invention according to claim 2 in which said flotation pontoon comprises: a block of rigid plastic foam, a substantially continuous sheet covering of asbestos cement board applied to at least some of the exposed nonhorizontal surfaces of said block.

4. The invention according to claim 3 which includes a layer of protective surface coating applied to all other external surfaces of said pontoon.

5. The invention according to claim 3 in which said asbestos cement board is applied to all exposed surfaces of said block.

6. The invention according to claim 3 in which a plurality of said deck assembly slabs are affixed together along their lengths to form an arbitrarily wide marina system structure.

7. The invention according to claim 3 in which a plurality of said deck assembly slabs are affixed together along their ends to form an arbitrarily long marina system structure.

8. The invention according to claim 3 in which a plurality of said deck assembly slabs are affixed together to form longitudinal walkways and transverse finger piers affixed together at the sides of the walkway rub rail stringer deck element.

9. The invention according to claim 3 in which said marina system structure includes a non-floating sundeck portion and a floating dock portion and a deck assembly slab gangway making said portions accessible to each other.

10. The invention according to claim 6 in which said slabs each include a pair of said rub rail stringer elements and in which laterally adjacent slabs are disposed with a respective one of said rub rail stringer elements of one slab being disposed in horizontally juxtaposed contact with a respective one of said rub rail stringer elements of another slab; and which further includes rigid fastening means for securing said juxtaposed rub rail stringer elements together.

11. The invention according to claim 7 which futrher ncludes a plurality of said slabs disposed in juxtaposed contact along their lengths; and end rigid bracing cross members consisting of at least one common continuous rub rail stringer element with holes to receive the horizontal tension members of the deck assembly.

12. The method of constructing a marina system structure comprising the steps of: placing upside down against a horizontal reference plane a plurality of elongated wooden deck elements to form an arbitrarily long deck assembly slab; compressing all of said elements against said reference plane structure; laterally compressing said elements; boring at least one hole through said elements transversely to said slab; inserting a tension member through said hole, affixing the ends of said tension member in compressive relationship to the outermost ones of said elements; applying initial tension in said tension member thereof to compress laterally all of said elements; affixing a bend and torsion resistant member transversely across said elements in lateral shrinkage relieving contact therewith; moving said assembly slab longitudinally and repeating said boring and affixing steps; inserting additional ones of said elements into said assembly slab whenever one of said elements terminates short of the desired slab length in effectively spliced engagement with the after end of the preceding said one of said elements; and cutting said assembly slab to a desired length.

13. A floating wharf structure comprising: at least two deck assembly slabs each including a plurality of elongated horizontally disposed wooden deck members each having vertical and horizontal cross dimensions, said vertical cross dimension being at least equal to said horizontal cross dimension, and at least a predominance of said members having a substantially vertical cross end grain; a plurality of horizontal bend and torsion resistant bracing members disposed in contact with the bottom surface of and transversely to each of said slabs and extending across substantially the entire width of both of said slabs; a plurality of vertical tension elements passing through said bracing members and ones of said deck members for securing them into an integral assembly, said slabs being laterally spaced on said bracing members to define a utility trough therebetween; and removable trough cover means disposed over said trough between said slabs and having a top surface, when so disposed, which is substantially coplanar with the top surfaces of said slabs.

References Cited by the Examiner

UNITED STATES PATENTS

| | | | |
|---|---|---|---|
| 2,674,775 | 4/1954 | Willson. | |
| 2,892,433 | 6/1959 | Walker | 114—.5 |
| 3,083,665 | 4/1963 | Steidley | 114—.5 |
| 3,157,144 | 11/1964 | Jarnett | 114—.5 |

MILTON BUCHLER, *Primary Examiner.*

FERGUS S. MIDDLETON, *Examiner.*